Dec. 22, 1942.   G. G. SOMERVILLE   2,306,229
ELECTRIC VALVE SYSTEM
Original Filed March 30, 1942

Inventor:
Gareth G. Somerville,
by Harry E. Dunham
His Attorney.

Patented Dec. 22, 1942

2,306,229

UNITED STATES PATENT OFFICE 2,306,229

ELECTRIC VALVE SYSTEM

Gareth G. Somerville, Pittsfield, Mass., assignor to General Electric Company, a corporation of New York Original application March 30, 1942, Serial No. 436,813. Divided and this application July 10, 1942, Serial No. 450,439

9 Claims. (Cl. 219—4)

My invention relates to electric valve systems and more particularly to electric valve apparatus for energizing load circuits, such as welding circuits, from alternating current supply circuits.

This application is a division of my copending patent application Serial No. 436,813, filed March 30, 1942, and which is assigned to the assignee of the present application.

In some industrial applications, such as electric resistance welding equipments, it is frequently desirable to transmit to a load circuit, or welding circuit, a predetermined amount of current of relatively short duration. In accordance with the teachings of my invention described hereinafter, I provide new and improved electric valve equipment wherein this object may be accomplished by employing apparatus to greater advantage, thereby decreasing the size of the equipment to supply a given amount of power or energy to the load or welding circuit.

It is an object of my invention to provide new and improved electric valve translating apparatus.

It is another object of my invention to provide new and improved electric valve welding apparatus.

It is a further object of my invention to provide new and improved electric valve welding apparatus wherein predetermined pre-heating or post-heating current may be transmitted to the welding circuit and wherein the welding current is applied to the work at predetermined times.

It is a still further object of my invention to provide new and improved electric valve welding apparatus wherein alternating current is continuously supplied to the welding circuit during a predetermined interval of time, and in which impulses of welding current are superimposed on the alternating current at predetermined recurring times.

Briefly stated, in one of the illustrated embodiments of my invention, I provide new and improved electric resistance welding equipment of the energy storage type wherein alternating current is continuously supplied to the welding circuit to pre-heat or post-heat the work, and wherein the welding operation is accomplished by the periodic change in the state of energization of the energy storage means, such as a capacitance.

Figure 1:
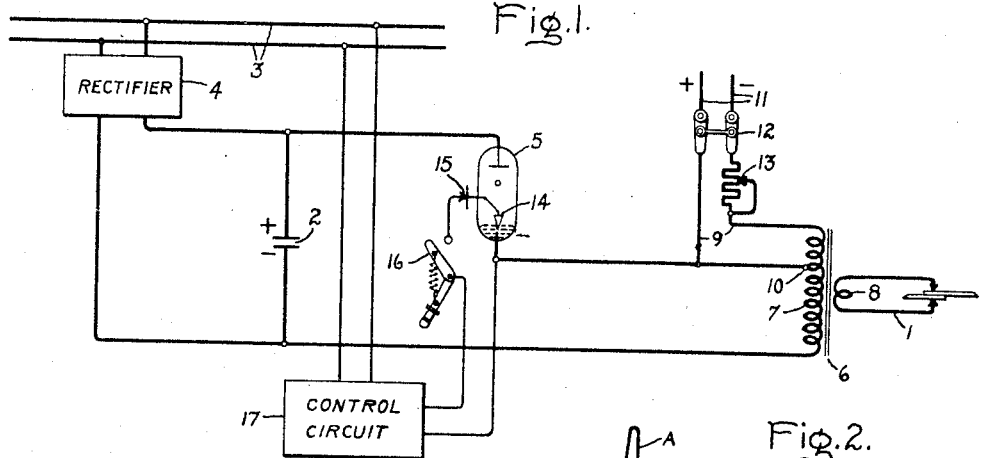
Figure 2:
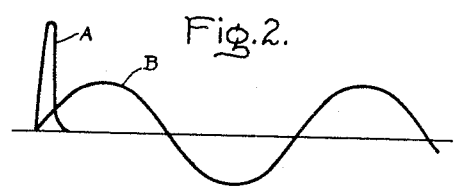
Figure 3:
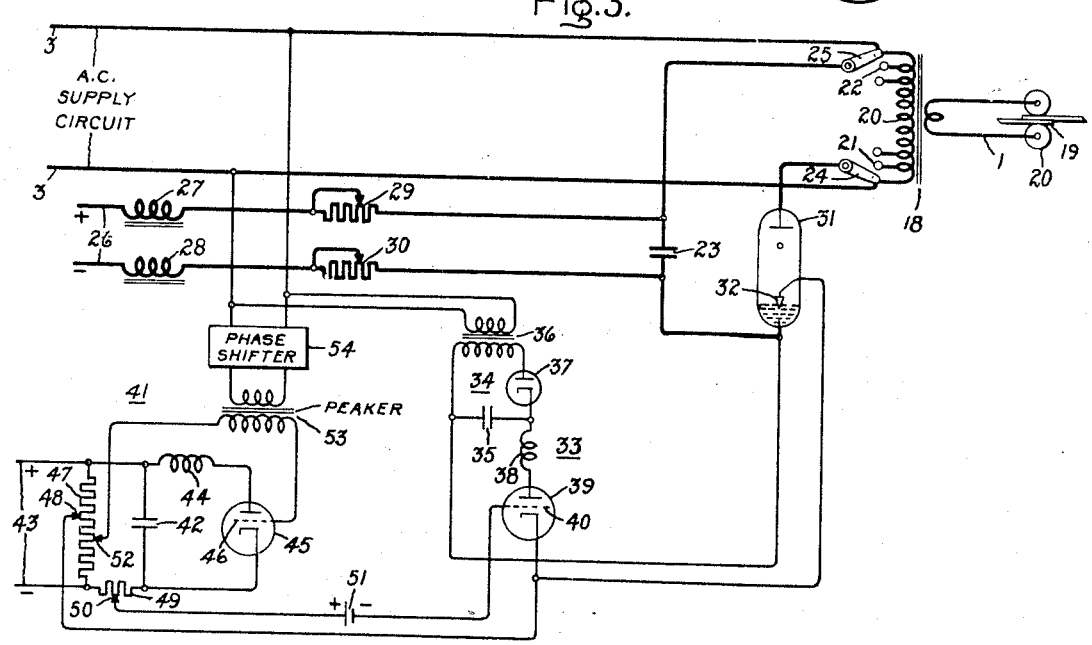
Figure 4:
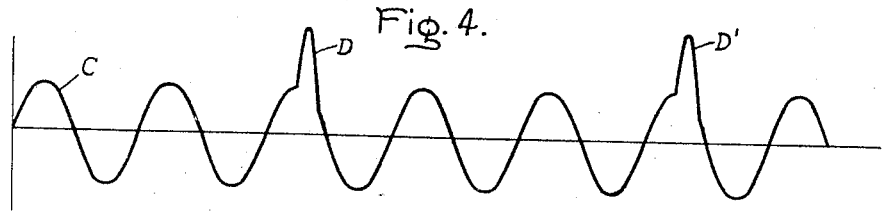

For a better understanding of my invention, reference may be had to the following description taken in connection with the accompanying drawing, and its scope will be pointed out in the appended claims. Fig. 1 of the accompanying drawing diagrammatically illustrates an embodiment of my invention as applied to a welding system and in which a capacitance is charged from a supply circuit and discharged through the welding transformer in order to produce the weld, and in which the power transformer is premagnetized or presaturated to prevent cumulative unidirectional magnetization of the transformer by the discharge of the capacitance; Fig. 2 represents certain operating characteristics of the arrangement shown in Fig. 1. Fig. 3 diagrammatically illustrates another embodiment of my invention in which alternating current is supplied to the welding circuit, and in which the current which produces the weld is superimposed on the alternating current by means of the discharge of a capacitance; Fig. 4 represents an operating characteristic of the circuit shown in Fig. 3.

Referring now to Fig. 1 of the drawing, I have there illustrated my invention as applied to a system for energizing a welding circuit 1. A capacitance 2 is charged from a suitable supply circuit, such as an alternating current supply circuit 3, through a rectifier 4, to charge the capacitance to the polarity indicated. The capacitance 2 is discharged to energize the welding circuit through a circuit including electric valve means 5 and transforming means 6. The transforming means 6 is provided with primary winding means 7 and secondary winding means 8 which is connected to the welding circuit 1. The transforming means 6 is also, of course, provided with a magnetic core structure. In order to prevent cumulative unidirectional magnetization of the transforming means 6, occasioned by successive discharges of the capacitance 2, I provide means for impressing on the core structure of the transforming means 6 a magnetomotive force, preferably unidirectional, and which is in opposition to the magnetomotive force which is caused by the discharge of a capacitance 2 through the transforming means 6. This unidirectional magnetization of the transforming means 6, which is in opposition to that produced by the discharge of capacitance 2, also affords greater utilization of the core structure of the transforming means 6, thereby making it possible to deliver a greater amount of energy or power to the welding circuit 1, or permitting the use of a small transforming means to deliver a given amount of power. The premagnetizing or presaturating means may comprise a circuit 9 which is connected to a portion of the primary winding means 7 lying between one terminal of the primary winding means and an intermediate terminal 10. Unidirectional current is transmitted to a portion of the primary winding means 7 from circuit 9 which may be energized from a direct current supply circuit 11, of the polarity indicated, through a switch 12. The magnitude of the unidirectional magnetomotive force impressed on the core structure of the transforming means 6 may be controlled or determined by any suitable means, and for the purpose of illustrating a means for accomplishing this result I have represented a variable impedance means, such as a variable resistance 13, connected in series relation with the upper portion of the primary winding means 7 and circuit 11.

The electric valve means 5 is preferably of the type employing an ionizable medium, such as a gas or a vapor, and in which the conduction of current is controlled by the potential impressed on a control means such as an immersion-igniter control member 14. The electric valve means 5 conducts current when a suitable current is transmitted to the control member 14. A unidirectional conducting device 15 may be connected in series relation with control member 14, and the time of discharge of the capacitance 2 through the operation of electric valve means 5 may be controlled by means of a switch 16 which is connected in circuit with the control member 14. Switch 16 may be a switch of the type which, upon actuation, closes its contacts for a relatively short interval of time, so that the energizing voltage or current is supplied to the control member 14 during a correspondingly short interval of time.

A control circuit 17 may be employed to supply current to the control member 14, and this circuit may comprise a timing device such as that explained hereinafter in connection with the arrangement of Fig. 3, or may merely include a peaking transformer and phase shifting means for supplying current to the control member 14 through the unidirectional conducting device 15 and switch 16.

The operation of the embodiment of my invention shown in Fig. 1 will be explained by considering the system when it is desired to effect the transmission of an impulse of current to the welding circuit 1. The premagnetizing or pre-saturating circuit of the transforming means 6 establishes therein a unidirectional magnetization of predetermined magnitude which is in a direction opposite to that which is effected by the discharge of capacitance 2. In order to obtain the greatest utilization of the iron of the transforming means, the core structure should be magnetized to a point of substantial saturation.

Upon operation of switch 16, at a definite point in the cycle of the voltage of supply circuit 3, an impulse of current is transmitted to control member 14 of electric valve means 5, rendering the electric valve means 5 conducting and effecting discharge of capacitance 2 through a circuit including the anode-cathode circuit of electric valve means 5 and the lower portion of the primary winding means 7. It will be noted, of course, that this current traverses the primary winding means 7 in a direction opposite to the direct current supplied to this winding by means of circuit 9. The incident rate of change of flux occasioned by the capacitance discharge current through the primary winding means 7 induces a voltage in the secondary winding means 8, and consequently causes the transmission of an impulse of welding current to the welding circuit 1.

As soon as the welding operation is effected, the residual magnetization effect, which would be present in the absence of the unidirectional magnetization caused by circuit 9, is neutralized thereby maintaining an initial predetermined magnetization of the core structure of the transforming means 6 of the desired polarity, and thereby preventing the cumulative unidirectional magnetization of the core structure which would be caused by successive discharges of capacitance 2 through primary winding means 7. In this manner, the discharge of capacitance 2 is always initiated at the same predetermined magnetization of the core structure, thereby obtaining uniformity in the magnitude of the welding current and uniformity in the welds produced.

It is to be understood that the control circuit and switch 16 shown in Fig. 1 are diagrammatic representations of the control circuit which may be employed. For example, the switch 16 may be of the type which maintains its contacts closed for only a short interval of time in response to a single circuit controlling operation, so that the electric valve means 5 is not maintained in a conducting condition for an appreciable period. This requirement is apparent in view of the fact that it would be undesirable to maintain the electric valve means 5 conducting immediately after each discharge of the capacitance 2.

Curve A of Fig. 2 represents the welding current supplied to circuit 1 occasioned by discharge of capacitance 2, and curve B represents the voltage of the alternating current circuit 3. The control circuit 17 may be arranged to obtain synchronization of the impulses of discharge or welding current with respect to the voltage of the alternating current circuit 3.

Fig. 3 diagrammatically illustrates another embodiment of my invention wherein the welding circuit 1 is energized from an alternating current supply circuit 3 through a transforming means 18. The welding current in this arrangement may be applied to work 19 through a pair of wheels 20 which act as electrodes for those applications in which it is desirable to effect line welding operations. The transforming means 18 is provided with primary winding means 20 which may include a plurality of taps 21 and 22.

Alternating current of predetermined magnitude is continuously supplied to the work 19 from the supply circiut 3, in order to produce the desired pre-heating or post-heating of the work. The magnitude of the alternating current transmitted to the work 19 may be determined by control of the voltage of the supply circuit 3, or by the interposition between supply circuit 3 and transforming means 18 of suitable voltage controlling means such as an adjustable transformer or autotransformer (not shown).

The welding operations or the welds produced on the work 19 are effected by means of energy storage apparatus which may comprise a capacitance 23. More specifically, the welds are produced by a change in the state of the energization of capacitance 23 which is connected to the transforming means, such as primary winding means 20, through switches 24 and 25. Switches 24 and 25 may be arranged to engage selectively various taps of the group of taps 21 and 22, thereby controlling the magnitude of the welding current transmitted to the work 19 upon the change in energization of the capacitance 23.

In the embodiment of my invention illustrated in Fig. 3 the capacitance 23 is charged from a suitable source of direct current 26 through a circuit which may include inductances 27 and 28 and adjustable resistances 29 and 30. These elements prevent the feed-back of appreciable current or energy to circuit 26 upon discharge of capacitance 23.

As a means for discharging the capacitance 23 to produce the welds, I employ suitable circuit controlling means, such as electric valve means 31, which may be connected between one of the switches, such as switch 24. The electric valve means 31 is also preferably of the type employing an ionizable medium, such as a gas or a vapor, and may include control means which normally maintains the electric valve means nonconducting and which renders the valve means conducting at desired times. The control means may comprise an immersion-igniter control member 32 which initiates an arc discharge within the electric valve means upon the transmission of a predetermined minimum value of current to the control member.

I provide a control circuit 33 for transmitting an impulse of control current to control member 32, or for transmitting recurring or periodic impulses of current to the control member 32. Control circuit 33 may comprise a rectifier 34 which charges a capacitance 35 through a transformer 36 and a unidirectional conducting device or electric valve 37. The rectifier 34 may be energized from the supply circuit 3. Capacitance 35 is discharged through a circuit including inductance 38 and an electric valve 39 to supply an impulse of current to control member 32. It will be noted that the control member 32 is connected in the discharge circuit for the capacitance 35. The electric valve 39 may be of the type employing an ionizable medium, such as a gas or a vapor, and may include a grid 40 which determines the time at which the discharge of the capacitance 35 is initiated.

I provide timing means 41 which determines the time at which the electric valve means 31 is rendered conducting, and also may determine the periodicity of the welding impulses transmitted to the welding circuit 1. This timing means 41 may be of the single valve inverter type in which a capacitance 42 is charged and periodically discharged to produce a timing voltage which determines the times of conduction of electric valve 39.

Referring more particularly to the timing means 41, the capacitance 42 is charged from a source of direct current 43 and is discharged through a circuit including an inductance 44 and an electric discharge device 45 having a grid 46. A voltage divider including a resistance 47 is connected across the direct current circuit 43, and is provided with an adjustable connection 48 which is connected to the cathode of electric valve 40. An adjustable resistance 49 is connected in the manner indicated and is provided with an adjustable tap 50 which is connected to the grid 40 of electric valve 39 through a voltage biasing means, such as a battery 51. The negative potential of battery 51 tends to maintain the electric valve 39 nonconducting except during those intervals when the periodic voltage produced by timing means 41 attains a value sufficiently positive to render the electric valve means 39 conducting. The periodicity of the periodic impulses produced by timing means 41 may be controlled by determining the position of contact 52 of resistance 47.

In order to synchronize the time of occurrence of the impulses of welding current caused by discharge of capacitance 23, I employ a peaking transformer 53 which is connected between contact 52 and grid 46 of electric discharge device 45. The peaking transformer 53 may be energized from alternating current supply circuit 3 through a suitable phase shifting device 54. Adjustment of the phase shifter 54 determines the time during the cycle of voltage of supply circuit 3 at which the periodic impulse produced by timing means 41 occurs and consequently determines the time at which the capacitance 23 is discharged to supply the welding current.

The operation of the embodiment of my invention shown in Fig. 3 will be explained by considering the system when it is performing a line welding operation; that is, when it is operating to transmit impulses of welding current to the work 19 at predetermined recurring times. Alternating current is continuously transmitted to the work 19, thereby producing the desired either pre-heating or post-heating of the work 19. The capacitance 23 which is charged from the direct current source 26 is periodically discharged to produce the impulses of welding current at regular recurring times.

Referring particularly to the discharging operation of the capacitance 23, the capacitance is discharged through a circuit including switch 25, primary winding means 20, switch 24 and the anode-cathode circuit of electric valve means 31. Consequently, the impulse of current produced by the discharge of the capacitance 23 is superimposed on the alternating component of current. This feature of operation is illustrated in Fig. 4 where the alternating component of current is represented by the curve C and where the welding current produced by discharge of capacitance 23 is represented by the peaks D and D' which are superimposed on the alternating sinusoidal current.

Electric valve 31 is rendered conducting by control circuit 33 which periodically discharges the capacitance 35 to energize the control member 32. The timing means or circuit 41 produces a periodic timing voltage synchronized with respect to the voltage of supply circuit 3 and renders the valve 39 in control circuit 33 conducting periodically. Due to the negative biasing potential impressed on grid 40 of electric valve 39 by battery 51, electric valve 39 is normally maintained nonconducting except at those times when the periodic voltage produced by timing means 41 attains a value sufficient to overcome the effect of the battery voltage. By adjustment of timing circuit 41, the periodicity of the welding current impulses may be controlled or adjusted.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current supply circuit, a load circuit, transforming means connected between said supply circuit and said load circuit and including primary winding means, a capacitance, means for charging said capacitance, and means for discharging said capacitance so that the current transmitted to said load circuit comprises a substantially continuous alternating current wave and a superimposed impulse of current caused by the discharge of said capacitance.

2. In combination, an alternating current supply circuit, a welding circuit, transforming means connected between said circuits and comprising primary winding means, said transforming means being continuously connected to said supply circuit so that alternating current is transmitted to said welding circuit, a capacitance, means for charging said capacitance, and means connected between said capacitance and said transforming means for discharging said capacitance and for superimposing on the alternating current transmitted to said welding circuit an impulse of current incident to the discharge of said capacitance.

3. In combination, an alternating current supply circuit, a welding circuit, transforming means connected between said supply circuit and said welding circuit and including primary winding means, said transforming means being connected permanently to said supply circuit so that alternating current is continuously supplied to said welding circuit, a capacitance, a charging circuit for said capacitance, and means connected between said capacitance and said primary winding means for periodically changing the state of energization of said capacitance and for superimposing on the alternating component of current transmitted to said welding circuit an impulse of current incident to the change in the state of energization of said capacitance.

4. In combination, an alternating current supply circuit, a welding circuit, transforming means comprising primary winding means connected to said alternating current supply circuit and having secondary winding means connected to said welding circuit, said transforming means being excited from said supply circuit for supplying alternating current continuously to said welding circuit, a capacitance, a direct current circuit connected to said capacitance, inductive means connected between said direct current circuit and said capacitance, and means for controlling the energization of said capacitance through at least a portion of said primary winding means and for superimposing on the alternating component of current transmitted to said welding circuit an impulse of current incident to the change in the state of energization of said capacitance.

5. In combination, an alternating current supply circuit, welding circuit, transforming means connected between said supply circuit and said welding circuit and including primary winding means, said transforming means being connected to said supply circuit so that alternating current is continuously supplied to said welding circuit, a capacitance, a direct current circuit for charging said capacitance, normally nonconducting electric valve means connected between said capacitance and said primary winding means, and means for periodically rendering conducting said electric valve means and for discharging said capacitance and for superimposing on the alternating component of current transmitted to said welding circuit an impulse of current incident to the discharge of said capacitance.

6. In combination, an alternating current supply circuit, a welding circuit, transforming means connected between said supply circuit and said welding circuit and including primary winding means, said transforming means being connected to said supply circuit so that alternating current is continuously supplied to said welding circuit, a capacitance, a direct current circuit connected to said capacitance, normally nonconducting electric valve means connected between said capacitance and said transforming means, and means for periodically rendering said electric valve means conducting to change the state of energization of said capacitance and for superimposing on the alternating component of current transmitted to said welding circuit an impulse of current incident to the change in the state of energization of said capacitance.

7. In combination, an alternating current supply circuit, a welding circuit, transforming means connected to said welding circuit, said transforming means being continuously energized from said supply circuit so that alternating current is transmitted to said welding circuit to preheat the work, a capacitance, means for charging said capacitance, and means for discharging said capacitance through said transforming means and for superimposing on the alternating current transmitted to said welding circuit an impulse of current to effect the welding operation.

8. In combination, an alternating current supply circuit, a welding circuit, transforming means connected between said circuits and comprising primary winding means, a capacitance, means for charging said capacitance, means connected between said capacitance and said transforming means for discharging said capacitance to effect the welding operation, and means for continuously energizing said transforming means from said supply circuit so that alternating current is transmitted to said welding circuit.

9. In combination, an alternating current supply circuit, a welding circuit, transforming means connected between said circuit and comprising primary winding means, a capacitance, means for charging said capacitance, means connected between said capacitance and said transforming means for discharging said capacitance and for transmitting an impulse of welding current to the circuit, and means for continuously energizing the primary winding means from said supply circuit and for supplying alternating current to said work prior and subsequent to the welding operation.

GARETH G. SOMERVILLE.